United States Patent [19]

Copeland, III et al.

[11] Patent Number: 5,179,661

[45] Date of Patent: Jan. 12, 1993

[54] METHOD AND APPARATUS FOR SERIAL DATA FLOW CONTROL

[75] Inventors: John A. Copeland, III, Dunwoody; John W. Jerrim, Duluth; Scott C. Swanson, Roswell, all of Ga.

[73] Assignee: Hayes Microcomputer Products, Inc., Norcross, Ga.

[21] Appl. No.: 429,065

[22] Filed: Oct. 30, 1989

[51] Int. Cl.⁵ .......................................... G06F 13/00
[52] U.S. Cl. ........................ 395/250; 364/239.6; 364/239.2; 364/260.1; 364/222.2; 364/932.8; 364/939.6; 395/800; 395/325
[58] Field of Search ............... 364/DIG. 1, DIG. 2; 395/250, 325, 800

[56] References Cited

U.S. PATENT DOCUMENTS

| | | | |
|---|---|---|---|
| 3,573,744 | 4/1971 | Rigazio | 364/200 |
| 4,040,027 | 8/1977 | van Es et al. | 364/900 |
| 4,258,418 | 3/1981 | Heath | 364/200 |
| 4,271,518 | 6/1981 | Birzele et al. | 364/200 |
| 4,327,411 | 4/1982 | Turner | 364/900 |

Primary Examiner—Eddie P. Chan
Attorney, Agent, or Firm—Jones, Askew & Lunsford

[57] ABSTRACT

A data flow controller (150) for monitoring and automatically controlling the flow of serial data from a remote transmitter to a host device. A serial communications card (11) provides an interface between a remote transmitter connected to a serial port connector (20) and a host device (10). The card (11) contains a UART (14) which has a buffer. A counter (151) counts the number of bytes received by the UART (14) since the last time that the host (10) read all the data in the buffer. If the number exceeds a predetermined portion of the buffer capacity the counter output (Q11) will go high, thereby disabling the counter and sending a control signal (DTR, RTS) to the remote transmitter to stop sending data. Once the host (10) has read all the data in the buffer the UART (14) provides a signal (−RXREADY) which resets the counter (151), thereby causing the output (Q11) to go low, thereby allowing the remote transmitter to resume sending data. The counter (151) is held in a reset state until the buffer has received at least one byte of data. Data flow control is therefore obtained without the intervention of the host (10).

26 Claims, 3 Drawing Sheets

METHOD AND APPARATUS FOR SERIAL DATA FLOW CONTROL

TECHNICAL FIELD

This present invention relates to data transfer systems and, more particularly, describes a method and apparatus for preventing the loss of serial data by controlling the flow of such data from a data communications device.

BACKGROUND OF THE INVENTION

There are numerous software programs and hardware devices currently available which allow asynchronous serial communications to be performed. A typical asynchronous communications application on a host computer consists of two functional entities: an Interrupt Service Routine (ISR), which is activated each time an interrupt is received from the serial port, and the application, which takes the characters received from the ISR and performs the requested operation.

The receiving of a character by the host computer typically goes through the following process. The character is generated by a remote transmitter, such as the receiving section of a modem, sent to a serial communications card, converted from a serial data format stream into a parallel data format character, and placed in a serial communications card buffer. The serial card then signals the host computer, with an interrupt, that a character is ready to be read from the serial card. The host computer has a maximum time of (1/character rate) to read this character from the serial card buffer before the serial card will receive another character and place this character in the buffer. For example, if each serial character requires 10 bits, including start and stop bits, then at 9600 bits per second (bps) or 960 characters/second, the host computer has (1/960) seconds (1.04 milliseconds) to read the character before it is lost. If the host computer does not read this character in time the character will be overwritten in the serial card buffer by the next character, and will be considered to have been "dropped." At higher data rates, the time constraints become more severe: at 19200 bps, the host has 0.52 milliseconds to read the character; at 38400 bps, the time drops to 0.26 milliseconds.

The host computer, upon receiving the interrupt, must stop whatever else it is doing and immediately read the character from the serial card. This is done by executing the serial card ISR. The ISR has a number of tasks to perform. Typically, it will first disable interrupts to prevent another interrupt from preempting the ISR. The ISR must then query the serial card to determine what caused the interrupt. Once it is determined that an incoming character has caused the interrupt, the host must verify that neither a parity error nor an overrun error was detected by the serial card, read the character from the serial card (thus clearing the interrupt), and place the character in a Random Access Memory (RAM) buffer for the application to process later. If the RAM buffer is approaching a full level the ISR may signal the remote computer to stop sending data. Additionally, the ISR may reenable the interrupts so that other devices can be serviced by their own ISRs.

Hardware devices employed for asynchronous serial communications typically contain a universal asynchronous receiver transmitter (UART), such as the 8250, 16450, and 16550A manufactured by National Semiconductor, Santa Clara, Calif. Software programs are generally designed to support a particular type of UART. The 16550A UART has a 16 byte buffer which eliminates the need for immediate attention to an interrupt generated by the UART. However, the host computer must service the UART at a sufficient rate to prevent the buffer from filling up or data will be lost.

The typical method employed for preventing data loss is to use data flow control: the software program signals the remote transmitter to halt the output of data until the host computer catches up with the data stored in the buffer. Typically, data flow control drives either the DTR (Data Terminal Ready) or the RTS (Request To Send) line of the serial card to a "not ready" status to halt the flow of serial data from the remote transmitter. Also, several data transfer protocols provide flow control via ASCII commands such as XON or XOFF.

A problem with this method exists because an application running on a computer with a long latency time, such as a multitasking system, may be slow in signalling the remote transmitter. Also the remote transmitter may send one or more characters before responding to the signal. The result is that the overall response time is too slow to halt the flow before data are lost. Also, some applications may not support flow control.

Therefore, there is a need for a serial data flow control method which signals the remote transmitter to halt the flow of a data in a timely manner such that data loss is prevented.

There is also a need for a method and apparatus which automatically controls the serial data flow without the intervention or knowledge of the application.

SUMMARY OF THE INVENTION

The present invention provides a method and apparatus whereby a remote transmitter in a data communications device may be signalled to halt the flow of data without the intervention or knowledge of the application program. The invention exists as part of an asynchronous serial communications adapter card for use in host computers. The preferred embodiment of the present invention has a 16550A UART, a microprocessor which can be instructed to enable or disable the automatic flow control feature, circuitry to perform the automatic flow control, and gates which allow the microprocessor to enable or disable the automatic flow control circuitry.

The UART has a signal, BAUDOUT, which is a clock at 16 times the baud rate. The UART also has an inverted signal, −RXREADY, which is enabled to go low when there is at least one byte of serial data in the UART's 16 byte FIFO (First In First Out) buffer. The present invention uses these two signals and a counter to perform the flow control. When the −RXREADY signal goes low, the counter is enabled which counts the BAUDOUT cycles. After a predetermined number of BAUDOUT cycles are counted without the FIFO buffer being empty an output of the counter is enabled which disables the counter. This output deasserts the DTR and/or RTS signals to the remote transmitter. This signals the remote transmitter to stop sending. The enabling of the counter output thus results in the remote transmitter halting its transmission of data.

When the transmission of data from the remote transmitter is halted, the UART FIFO has a chance to be emptied by the host computer. After the FIFO is emptied, −RXREADY returns to high, thus clearing the counter. The DTR and/or RTS signals are then reasserted, and the remote transmitter can resume the transmission of data.

The present invention therefore automatically signals the remote transmitter to stop sending when the FIFO buffer fills to a certain point and to resume sending once the FIFO buffer has been completely emptied. This relieves the host of the duty of managing the flow control.

The present invention also provides for the enabling or disabling of the automatic flow control by the user. The automatic flow control is disabled by blocking the Q11 output signal.

The present invention, while providing for automatic flow control, also allows the host computer to directly deassert the DTR and/or RTS signals and signal the remote transmitter to stop sending.

It is therefore an object of the present invention to provide a method and an apparatus for automatically controlling the flow of serial data from a remote transmitter without the intervention or knowledge of the application program in the host computer.

It is a further object of the present invention to prevent the loss of serial data by controlling the flow of such data from a remote transmitter.

It is a further object of the present invention to provide a means for enabling or disabling the apparatus for automatically controlling the flow of serial data from a remote transmitter.

It is a further object of the present invention to provide for automatic flow control while still allowing the host computer to signal the remote transmitter to stop sending data.

DETAILED DESCRIPTION OF THE PREFERRED EMBODIMENT OF THE PRESENT INVENTION

Figure 1:
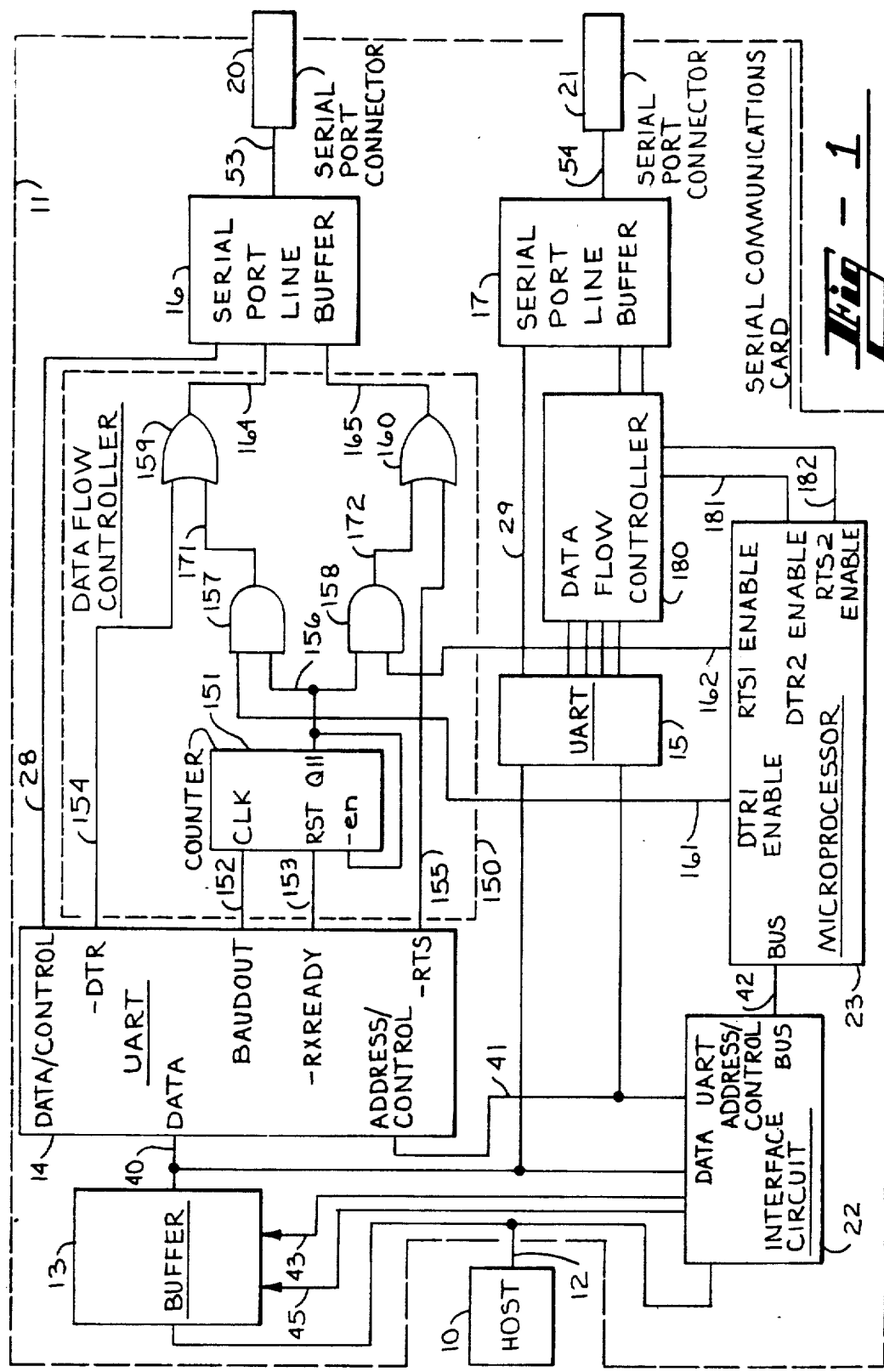
FIG. 1 is a schematic diagram of the preferred embodiment of the present invention in its preferred environment.

Turning now to the drawings, in which like numerals represent like components, FIG. 1 is a schematic diagram of the preferred embodiment of the present invention in its preferred environment. Host computer 10 is connected to a dual channel asynchronous serial communications card 11 via a host bus 12, which represents the host address, data, and control buses. Card 11 is installed in an expansion slot in host 10. Card 11 contains a host data buffer 13, two parallel-serial converters such as universal asynchronous receiver transmitters (UARTs) 14 and 15 or universal synchronous asynchronous receiver transmitters (USARTs), two data flow controllers 150 and 180, two serial port line buffers 16 and 17, two serial port connectors 20 and 21, an interface circuit 22, and a microprocessor 23. Data flow controller 150 contains a counter 151 and gates 157-160. Data flow controller 180 is identical to and performs the same functions as data flow controller 150.

Host 10 may use only UART 14 or UART 15, or may be using both UARTs simultaneously. Furthermore, one UART, such as UART 14, may be configured for automatic data flow control while the other UART, such as the UART 15, may be configured for standard flow control. It will be noted that UARTs 14 and 15 share a common data bus 40 which connects them to host data buffer 13 and the interface circuit 22. The UARTs also share a common address-control bus 41, which connects them to the interface circuit 22. Host data buffer 13 and interface circuit 22 are connected by host bus 12 to host 10. Host data buffer 13 is a bidirectional buffer which controls the flow of data to and from host 10. The operation of buffer 13 is controlled by interface 22 via conductors 43 and 45. Because of the common buses 40 and 41, host 10 and microprocesor 23 must be restrained in their ability to place data, address and control signals on these buses or there will be a bus contention problem with subsequent loss of data. In the preferred embodiment of the present invention, interface circuit 22 controls the access of host 10 and microprocessor 23 to buses 40 and 41 and therefore to the UARTs of the data flow controllers 150 and 180. In the preferred embodiment, UARTs 14 and 15 are National Semiconductor type NS 16550, and microprocessor 23 is an Intel type 8031.

In the preferred embodiment, interface circuit 22 is implemented by a gate array. However, interface circuit 22 may, if desired, be implemented by a microprocessor. The construction and operation of interface circuit 22 will be apparent to one of ordinary skill in the art after a reading of the functions performed by interface circuit 22, described below. In the preferred environment host 10 is an IBM PS/2, XT, AT or PC, or other compatible computing machine. In the preferred environment serial port connectors 20 and 21 are each connected to a communication device (not shown), such as a modem. Serial port connectors 20 and 21 preferably define an EIA RS-232-D serial interface. UARTs 14 and 15 convert data between a serial data format on connectors 20 and 21 and a parallel data format on bus 40. Buffers 16 and 17 perform standard line buffering and signal inverting functions.

Card 11 is designed to be compatible with existing software drivers which expect to find a single UART at a predetermined address. However, in the preferred environment host 10 contains driver software designed to use either or both UARTs on card 11 as well as the additional features provided by card 11. Some of these additional features are first in, first out (FIFO) buffers for both transmit and receive modes, automatic flow control for data incoming on serial port connectors 20 and 21, and direct memory access (DMA) data transfer of data between a memory in host 10 and the FIFOs in card 11. For additional details the reader is referred to co-pending U.S. patent application Ser. Nos. 07/428,858, 07/428,870, 07/429,150, filed concurrently herewith, all of which are hereby incorporated herein by reference.

The BAUDOUT and −RXREADY outputs of UART 14 are connected by conductors 152 and 153, respectively, to the clock (CLK) and reset (RST) inputs, respectively, of an 11-stage counter 151. The Q11 output of counter 151 is connected by conductor 156 to the negated enable (−EN) input of counter 151 and to one input of each of two 2-input AND-gates 157 and 158. It will be appreciated that, when −RXREADY is high (logic 1), counter 151 is reset, the Q11 output is low, and gates 157 and 158 are disabled and place a low on conductors 171 and 172. When −RXREADY is low (logic 0) counter 151 will count the BAUDOUT pulses on conductor 152 until output Q11 goes high. At this point counter 151 will no longer be enabled and will stay high. The high Q11 output enables gates 157 and 158. Therefore, if microprocessor 23 has placed a logic 1 onto conductors 161 or 162, then the outputs of gates 157 or 158, respectively, will be high. A logic 0 on conductor 161 or 162 disables gate 157 or 158, respectively.

The output of gates 157 and 158 are connected by conductors 171 and 172, respectively, to one input of 2-input OR-gate 159 and to one input of 2-input OR-gate 160, respectively. The negated data terminal ready (−DTR) and negated request to send (−RTS) outputs of UART 14 are connected by conductors 154 and 155, respectively, to the other input of gates 159 and 160, respectively. The output of gates 159 and 160 are connected by conductors 164 and 165, respectively, to serial port line buffer 16. The output of gates 159 and 160 are negated DTR and RTS signals, respectively, which are inverted and buffered by serial port line buffer 16 and then provided to the remote transmitter of the data communications device (not shown) connected to serial port connector 20.

In the preferred embodiment, automatic data flow control occurs as follows. UART 14 contains a 16 byte First In First Out (FIFO) buffer. UART 14 has a signal, −RXREADY, which is low whenever there is at least one byte of data, transmitted from serial data port 20 to the UART 14 FIFO buffer, which has not been read by host 10. UART 14 has another signal, BAUDOUT, which is a clock at 16 times the baud rate. When −RXREADY goes low counter 151 counts the BAUDOUT cycles. When 1024 BAUDOUT cycles pass without the FIFO buffer being empty the Q11 output of the counter 151 goes high. The count of 1024 BAUDOUT cycles represents 64 bit times or, at 10 bits per character, 6.4 character times. This leaves at least 9.6 character times remaining for the remote transmitter connected to serial data port 20 to respond before the FIFO buffer overflow. Thus, in the preferred embodiment of the present invention, data flow control is activated when the FIFO buffer is forty percent full. It should be noted that these values are design choices and are not critical.

When a count of 1024 is reached the Q11 output provides an enabling high signal to gates 157 and 158. If microprocessor 23 is providing a second enabling high signal to gates 157 and 158 over Data Terminal Ready 1 (DTR1) line 161 and Request To Send 1 (RTS1) line 162, the output of gates 157 and 158 provide high signals, respectively, to gates 159 and 160, respectively, which disables gates 159 and 160, thereby causing their outputs to be high, which sends a low for the RTS and DTR signals on serial port connector 20. This signals the remote transmitter to stop sending data, thus shutting down the flow of data from the serial data port 20 to the UART 14 FIFO buffer.

When the host 10 has fully processed the data within the UART 14 FIFO buffer such that the FIFO buffer is completely emptied, −RXREADY returns to high. This causes the counter 151 to be cleared, returning the output of the Q11 to a low. The outputs of gates 157 and 158 become low, as do the outputs of gates 159 and 160, thus causing the signals on connector 20 to go high, thereby allowing the remote transmitter to resume transmission of data to the UART 14 FIFO buffer.

It will therefore be appreciated that whenever host 10 is unable to keep up with the data transfer rate, the Q11 output of counter 151 will go high, thereby causing the DTR and/or RTS output signals on serial port connector 20 to go low and signal the remote transmitter to stop sending. Once the host 10 has read all the data in the buffer in UART 14 the −RXREADY signal will go low, thereby resetting counter 151 and holding counter 151 until the first byte has been received, at which point counter 151 will begin counting. If the host 10 can read the data from the FIFO in UART 14 at a sufficiently fast rate then the FIFO will be empty, which resets counter 151, at a rate sufficient to prevent the Q11 output from going high. In this case, flow control signals will not be asserted.

If, for some reason, automatic flow control is not desired, the user can cause host 10 to send a command, through interface circuit 22, to microprocessor 23 to disable the automatic flow control. In this case microprocessor 23 will place a low signal on conductors 161 and 162, thereby disabling gates 157 and 158, and causing gates 159 and 160 to function as non-inverting buffers. The host must then control the data flow by sending instructions to UART 14 to set its negated DTR and/or negated RTS outputs, on conductors 154 and 155, to the state necessary to start or stop the data flow.

It will be appreciated that, even if automatic flow control is enabled, host 10 can still cause the data flow to stop by causing UART 14 to place a high level on conductors 154 and 155, which causes gates 159 and 160 to place a high level on the DTR and RTS lines of connector 20, thereby signalling the remote transmitter to stop sending data. Therefore, host 10 can always stop the transfer of data.

It should be noted that the RTS and DTR lines of connector 20 may be controlled together or independently. Furthermore, one line, for example, the DTR line, may be under automatic flow control and the other line under host 10 flow control. Furthermore, UART 14 and data flow controller 150 may be controlled independently of UART 15 and data flow controller 180.

Figure 2:
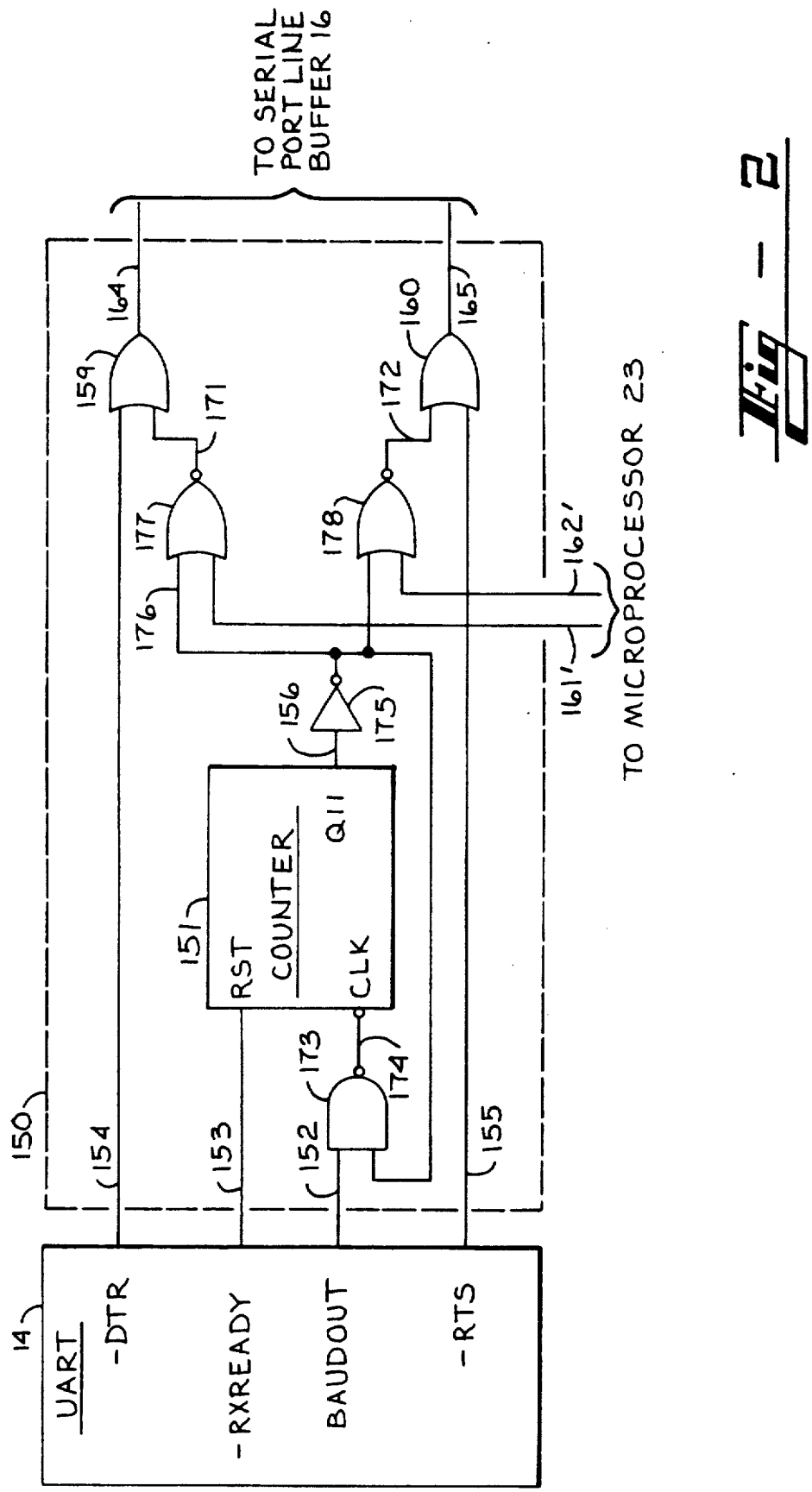
FIG. 2 is another embodiment of the data flow controller.

Turn now to FIG. 2 which is another embodiment of a data flow controller 150 or 180. The difference is that counter 151 does not have an enable input. In this case the BAUDOUT signal from UART 14 is connected by conductor 152 into one input of a 2-input NAND-gate 173. The Q11 output of counter 151 is connected by conductor 156 to the input of an inverter 175. The output of inverter 175 is connected by conductor 176 to the other input of gate 173 and to one input of each of two 2-input NOR-gates 177 and 178. The output of gates 177 and 178 are on conductor 171 and 172, respectively. The output of gate 173 is connected by conductor 174 to the negated clock (CLK) input of counter 151. When output Q11 goes high, the output of inverter 175 goes low, thereby disabling gate 173 and preventing any more clock pulses from reaching counter 151. Counter 151 therefore maintains its Q11 output until the -RXREADY signal on conductor 153 resets counter 151.

The other input of gate 177 and the other input of gate 178 are connected by conductors 161' and 162' to microprocessor 23. The prime (') mark indicates that the signal levels are inverted with respect to the signal levels of FIG. 1. If DTR flow control has been enabled microprocessor 23 will place a low level on conductor 161'. The low levels on conductor 161' and 176 force the output of gate 177 to go high, which forces the output of gate 157 high. After inversion by serial port line buffer 16, the signal on serial port connector 20 informs the remote transmitter to stop transmitting. The circuit of FIG. 2 thus performs the same function as the circuit of FIG. 1.

Figure 3:
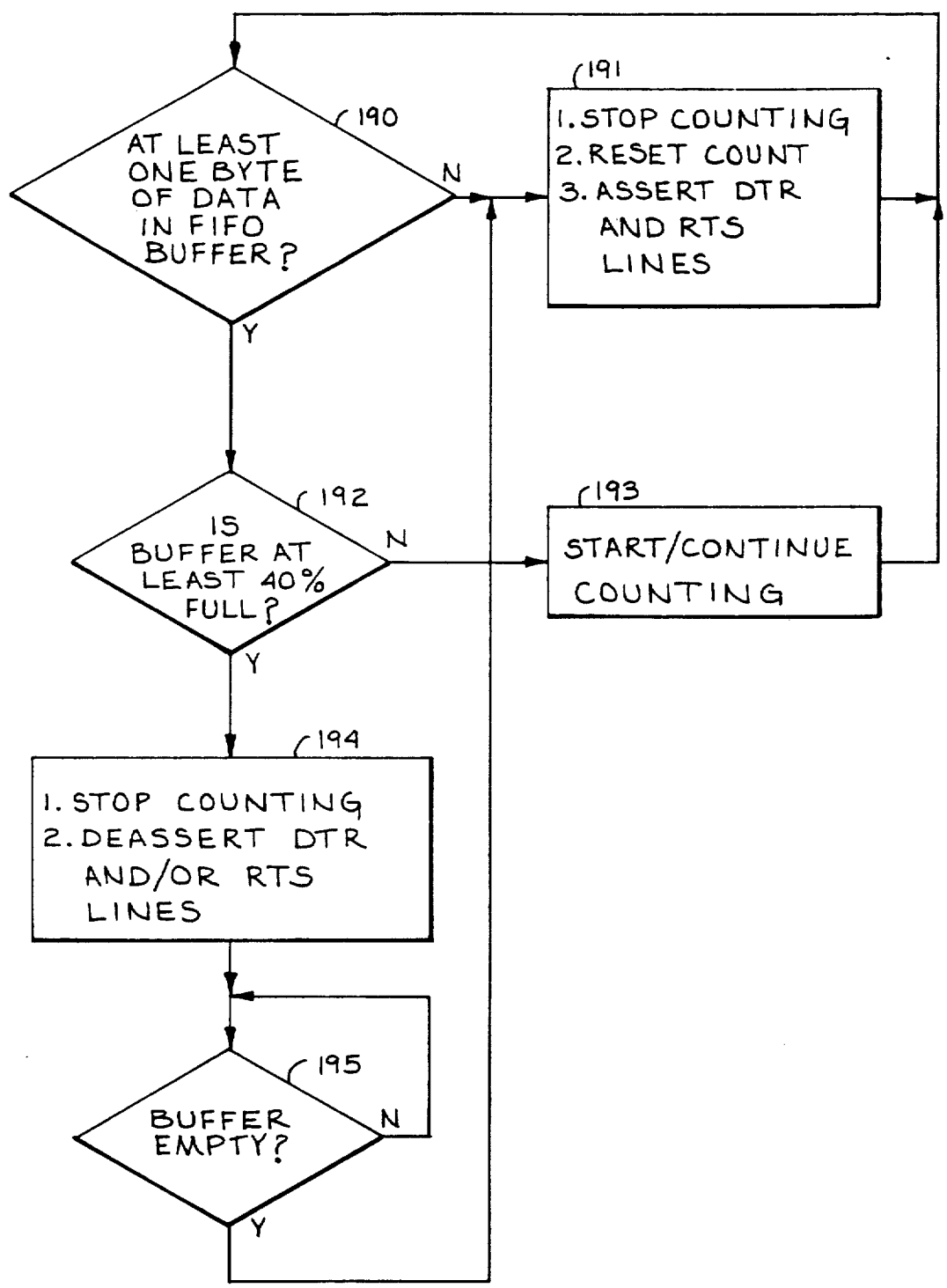
FIG. 3 is a flow chart of the operation of the preferred embodiment of the present invention.

Turn now to FIG. 3, which is flow chart of the operation of the preferred embodiment of the present invention. Decision 190 queries whether there is at least one byte of data in the FIFO buffer which has not been read by the host computer. If not, then, in step 191, the count is stopped and reset, the DTR and RTS lines are asserted, and a return is made to decision 190. If so, then decision 192 inquires whether the FIFO has become forty percent full, the level at which data flow control will be activated. If the buffer is not at least forty percent full then, in step 193, counting is started or continued. A return is then made to decision 190. If the buffer is at least forty percent full then, in step 194, counting is stopped and the DTR and/or RTS data lines are deasserted and the flow of data from the serial data port is halted. Decision 195 then determines whether the buffer has been emptied. If not, decision 195 is repeated. If so, then step 191 is executed to restart the data flow.

It will be seen from the above that counting is stopped and the count is reset each time that the buffer is empty. Likewise, if the buffer is not emptied then, after a predetermined count, the DTR and/or RTS lines are deasserted, thereby stopping the flow of data from the remote transmitter until the buffer has been emptied.

It will therefore be seen that data flow control will be executed without the intervention or knowledge of the host computer. This data flow control will prevent the loss of data which the host ordinarily would be unable to process quickly enough.

From the above it will be appreciated that the present invention describes a method and apparatus for automatically controlling the flow of serial data from a remote transmitter without the intervention or knowledge of the host computer. The present invention also prevents the loss of serial data by controlling the flow of such data from a remote transmitter. The present invention also provides a means for enabling or disabling the apparatus for automatically controlling the flow of serial data from a remote transmitter.

It will also be appreciated that data flow controllers 150 and 180 may be implemented as part of interface circuit 22 or microprocessor 23.

Although the preferred embodiment of the present invention has been described with particularity, it will be understood that numerous modifications and variations are possible. Accordingly, the scope of the present invention is limited only by the claims below.

What is claimed is:

1. An apparatus for controlling the flow of serial data from a data communications device to a host device, said apparatus preventing the loss of said data, comprising:
   a universal asynchronous receiver transmitter (UART) comprising: receiver means for receiving said serial data from said data communications device, means for converting said serial data to parallel data, storage means for storing said parallel data, means for providing said parallel data to said host device, control means responsive to said storage means being empty for providing
   a control signal, and clock means for providing a clock signal having pulses at a predetermined frequency;
   counter means functionally connected to said UART and responsive to said clock signal by counting said pulses for providing a count signal indicating that a predetermined number of bytes of said parallel data has been received, and responsive to said control signal for clearing said count signal; and
   interface means functionally connected to said counter means and responsive to provision of said count signal for instructing said data communications device to halt the transmission of said serial data.

2. The apparatus of claim 1, wherein said counter means comprises a counter disabled by said control signal.

3. The apparatus of claim 1, wherein said counter means provides said count signal when said predetermined number of bytes has been received and then continues to provide said count signal until said control means provides said control signal.

4. The apparatus of claim 1, wherein said counter means further comprises means responsive to said count signal for disabling said counter.

5. The apparatus of claim 1 wherein said counter means stops counting said pulses once said count signal has been provided.

6. A method for controlling the flow of serial data from a data communications device to a host device when using a universal asynchronous receiver transmitter (UART) to convert said serial data from said data communications device to parallel data for said host device, said UART providing clock pulses at a predetermined frequency, having a buffer for the temporary storage of said parallel data, and providing a control signal when said buffer is empty, said method preventing the loss of said data, comprising the steps of:
   counting said clock pulses;
   providing a count signal responsive to the number of said clock pulses exceeding a predetermined value;
   clearing said count signal in response to provision of said control signal; and
   responding to provision of said count signal by instructing said data communications device to halt the transmission of said serial data.

7. The method of claim 6, wherein said step of providing said count signal comprises:
   counting said number of clock pulses;
   providing said count signal when said number of pulses exceeds a predetermined value; and
   continuing to provide said count signal until said UART has provided said control signal.

8. In a system comprising a host device, a serial communications device containing a universal asynchronous receiver transmitter (UART), and a remote transmitter for sending the data to said host device by way of said serial communications device, said UART converting said data from a serial format into a parallel format, providing clock pulses at a predetermined rate, having a buffer for the temporary storage of said data and providing a first signal when said buffer is empty, an improvement to said serial communications device to prevent said buffer from overflowing by automatically signaling said remote to stop transmission of said data, comprising:
   first means for setting a pulse count to a first predetermined value in response to said first signal, for counting said clock pulses, and providing a second signal when said pulse count reaches a second predetermined value;
   second means responsive to provision of said second signal for rendering said first means non-responsive to said clock pulses; and third means responsive to provision of said second signal for providing a control signal to said remote transmitter to signal said remote transmitter to stop said transmission of said data.

9. The improvement of claim 8 wherein the difference between said second predetermined value and said first predetermined value corresponds to a predetermined number of bytes of data from said remote transmitter, said predetermined numbers of bytes being less than the capacity of said buffer.

10. The improvement of claim 8 wherein said first means comprises a counter.

11. The improvement of claim 10 wherein said second means comprises an enable input on said counter.

12. The improvement of claim 10 wherein said second means comprises a gate responsive to non-provision of said second signal for passing said clock pulses to said counter.

13. The improvement of claim 8 wherein said third means comprises an inverting buffer.

14. An apparatus for controlling the flow of serial data from a data communications device to a host device, said apparatus preventing the loss of said data, comprising:
 a universal synchronous-asynchronous receiver transmitter (USART) comprising: receiver means for receiving said serial data from said data communications device, means for converting said serial data to parallel data, storage means for storing said parallel data, means for providing said parallel data to said host device, control means responsive to said storage means being empty for providing a control signal, and clock means for providing a clock signal having pulses at a predetermined frequency;
 counter means functionally connected to said USART and responsive to said clock signal by counting said pulses for providing a count signal indicating that a predetermined number of bytes of said parallel data has been received, and responsive to said control signal for clearing said count signal; and
 interface means functionally connected to said counter means and responsive to provision of said count signal for instructing said data communications device to halt the transmission of said serial data.

15. The apparatus of claim 14, wherein said counter means comprises a counter disabled by said control signal.

16. The apparatus of claim 14, wherein said counter means provides said count signal when said predetermined number of bytes has been received and then continues to provide said count signal until said control means provides said control signal.

17. The apparatus of claim 14, wherein said counter means further comprises means responsive to said count signal for disabling said counter.

18. The apparatus of claim 14, wherein said counter means stops counting said pulses once said count signal has been provided.

19. A method for controlling the flow of serial data from a data communications device to a host device when using a universal synchronous-asynchronous receiver transmitter (USART) to convert said serial data from said data communications device to parallel data for said host device, said USART providing clock pulses at a predetermined frequency, having a buffer for the temporary storage of said parallel data, and providing a control signal when said buffer is empty, said method preventing the loss of said data, comprising the steps of:
 counting said clock pulses;
 providing a count signal responsive to the number of said clock pulses exceeding a predetermined value;
 clearing said count signal in response to provision of said control signal; and
 responding to provision of said count signal by instructing said data communications device to halt the transmission of said serial data.

20. The method of claim 19, wherein said step of providing said count signal comprises:
 counting said number of clock pulses;
 providing said count signal when said number of pulses exceeds a predetermined value; and
 continuing to provide said count signal until said USART has provided said control signal.

21. In a system comprising a host device, a serial communications device containing a universal synchronous-asynchronous receiver transmitter (USART), and a remote transmitter for sending the data to said host device by way of said serial communications device, said USART converting said data from a serial format into a parallel format, providing clock pulses at a predetermined rate, having a buffer for the temporary storage of said data and providing a first signal when said buffer is empty, an improvement to said serial communications device to prevent said buffer from overflowing by automatically signaling said remote transmitter to stop transmission of said data, comprising:
 first means for setting a pulse count to a first predetermined value in response to said first signal, for counting said clock pulses, and providing a second signal when said pulse count reaches a second predetermined value;
 second means responsive to provision of said second signal for rendering said first means non-responsive to said clock pulses; and
 third means responsive to provision of said second signal for providing a control signal to said remote transmitter to signal said remote transmitter to stop said transmission of said data.

22. The improvement of claim 21 wherein the difference between said second predetermined value and said first predetermined value and corresponds to a predetermined number of bytes of data from said remote transmitter, said predetermined number of bytes being less than the capacity of said buffer.

23. The improvement of claim 21 wherein said first means comprises a counter.

24. The improvement of claim 23 wherein said second means comprises an enable input on said counter.

25. The improvement of claim 23 wherein said second means comprises a gate responsive to non-provision of said second signal for passing said clock pulses to said counter.

26. The improvement of claim 21 wherein said third means comprises an inverting buffer.

* * * * *